(12) United States Patent
van Drunick

(10) Patent No.: US 8,978,299 B2
(45) Date of Patent: Mar. 17, 2015

(54) FLEXIBLE BIODEGRADABLE PACKAGE FOR FLOWER BULBS

(71) Applicant: Gardenvision International B.V., Voorhout (NL)

(72) Inventor: Michael Cornelis Pieter van Drunick, Voorhout (NL)

(73) Assignee: Gardenvision International B.V., Voorhout (NL)

(*) Notice: Subject to any disclaimer, the term of this patent is extended or adjusted under 35 U.S.C. 154(b) by 0 days.

(21) Appl. No.: 14/062,734

(22) Filed: Oct. 24, 2013

(65) Prior Publication Data

US 2014/0116305 A1 May 1, 2014

(30) Foreign Application Priority Data

Oct. 26, 2012 (EP) ...................................... 12190111

(51) Int. Cl.
*A01G 23/02* (2006.01)
*A01C 21/00* (2006.01)
*B65D 85/52* (2006.01)
*B65D 73/00* (2006.01)
*B65D 75/30* (2006.01)
(Continued)

(52) U.S. Cl.
CPC ................ *A01C 21/00* (2013.01); *B65D 85/52* (2013.01); *B65D 73/0071* (2013.01); *B65D 75/30* (2013.01); *A01G 9/102* (2013.01); *B65D 65/46* (2013.01); *B65D 75/52* (2013.01); *B65D 65/466* (2013.01); *B65D 75/525* (2013.01); *B65D 2565/383* (2013.01)
USPC ...................................... 47/74; 47/73; 47/65.8

(58) Field of Classification Search
USPC ....................................... 47/65.8, 65.7, 73, 74
See application file for complete search history.

(56) References Cited

U.S. PATENT DOCUMENTS 2,293,531 A * 8/1942 Brooks .............................. 47/73
3,112,577 A * 12/1963 Burger .............................. 47/74
(Continued)

FOREIGN PATENT DOCUMENTS

EP 243610 A1 * 11/1987 ............... A01G 9/02
FR 2 199 930 A1 4/1974
(Continued)

OTHER PUBLICATIONS

Richard Jauron, Planting Depth and Spacing of Spring-flowering Bulbs, Sep. 13, 2002 Horticulture and Home Pest News, http://www.ipm.iastate.edu/ipm/hortnews/2002/9-13-2002/bulbs.html.*
(Continued)

*Primary Examiner* — Kristen C Hayes
(74) *Attorney, Agent, or Firm* — Blakely Sokoloff Taylor & Zafman

(57) ABSTRACT

A flexible biodegradable package for flower bulbs for holding, storing, transporting and direct planting into the ground a plurality of flower bulbs, wherein said plurality of flower bulbs is placed between a flexible top layer of material comprising biodegradable fibers and a flexible bottom layer of material of material comprising biodegradable fibers, wherein said flower bulbs are separated by inter-bulb areas effected by a pre-selected inter-bulb distance, the bulbs being in a fixed position and a preferred planting orientation, said top layer being glued to the bottom layer at the inter-bulb areas and at the periphery of said layers. The invention also relates to methods of use and manufacturing of the package.

18 Claims, 5 Drawing Sheets

(51) Int. Cl.
  *A01G 9/10* (2006.01)
  *B65D 65/46* (2006.01)
  *B65D 75/52* (2006.01)

(56) References Cited

U.S. PATENT DOCUMENTS

| | | | | |
|---|---|---|---|---|
| 3,355,084 | A | * | 11/1967 | Donovan ................. 229/120.07 |
| 3,678,620 | A | * | 7/1972 | Voges ............................... 47/73 |
| 5,060,420 | A | * | 10/1991 | Bergman .......................... 47/78 |
| 5,287,651 | A | * | 2/1994 | de Graaf ........................ 47/65.9 |
| 6,161,331 | A | * | 12/2000 | Lalane .............................. 47/73 |
| 6,782,656 | B2 | * | 8/2004 | Washburn ...................... 47/29.2 |
| 2006/0117653 | A1 | * | 6/2006 | Werth ................................ 47/56 |
| 2010/0058658 | A1 | * | 3/2010 | Van Der Starre .............. 47/65.7 |

FOREIGN PATENT DOCUMENTS

| | | |
|---|---|---|
| GB | 2 418 587 A | 4/2006 |
| JP | H09 267882 A | 10/1997 |
| WO | WO 03/015496 A2 | 2/2003 |

OTHER PUBLICATIONS

Pierlot translation from FR 2.199.930, retrieved from EPO Jul. 14, 2014.*

* cited by examiner

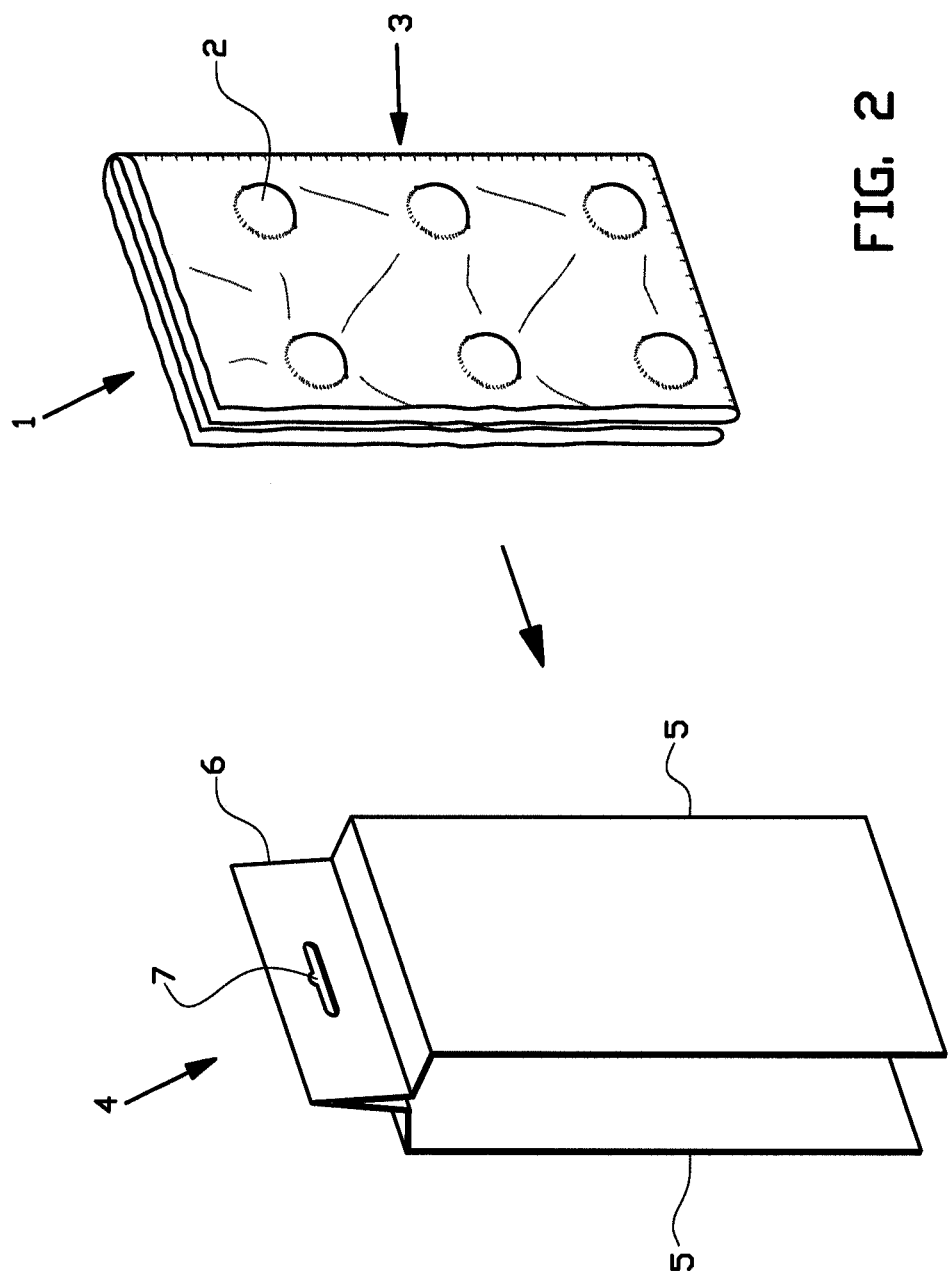

FLEXIBLE BIODEGRADABLE PACKAGE FOR FLOWER BULBS

FIELD OF THE INVENTION

The present invention relates to a flexible biodegradable package for holding, storing, transporting and direct planting into the ground a plurality of flower bulbs, and to methods of use thereof, and to the manufacturing of the package.

BACKGROUND OF THE INVENTION

Various varieties of flower bulbs are used to decorate the landscape or gardens. A common practice with respect to planting bulbs is to select one or more varieties of bulbs. Subsequently a hole is dug and the flower bulb is placed therein. The bulb is covered with soil and then usually watered depending on the humidity of the soil. Separate bulbs of separate varieties may be planted accordingly at predetermined distances from each other and in different combinations of varieties to create a desired landscape or pattern of flowers in the garden.

This practice however may lead to difficulties for persons that are not familiar with gardening. It may be difficult to plant bulbs in a particular pattern, such as a colour pattern of a particular shape of area, because it may be difficult to visualize on the basis of bulbs that all have a similar colour how the pattern of flowers will eventually look like. This difficulty is enhanced because bulbs of one variety may flower in a particular time of the year while others flower in a different time of the year.

In addition, bulbs of different varieties may require different conditions. For instance, some flower varieties may not be biologically compatible.

It may also be difficult and time-consuming to position bulbs correctly in the abovementioned pre-dug hole to ensure that the bulb is in the optimal position to grow, especially when one intends to plant a large number of bulbs.

Bulbs of different varieties may also require different inter-bulb distances in order to allow for healthy growth. Bulbs of a certain species may require a larger distance between bulbs than bulbs of other species.

Because of these difficulties and required technical knowledge, a person that is not familiar with gardening might be hesitative towards planting bulbs in the ground.

A variety of solutions have been proposed to solve the abovementioned problems in the form of containers with chambers formed into it for carrying bulbs. For instance WO03/015496 provides a flower bulb planting container that allows holding, storing, and subsequently planting flower bulbs into the ground. This container is made of a biodegradable material and can be planted in total into the ground. The container comprises a flat top surface and side walls depending therefrom and contains a plurality of truncated cavities depending from the top surface. In the bottom of each cavity a hole is provided to allow water entry and drainage after planting and to allow maturing roots easily to exit the cavity. The container described in WO03/015496 allows for pre-planting, off-the-shelf selection by the consumer of flower bulbs of possibly differing variety, biocompatibility and colour. Moreover, it provides a means to hold bulbs at a chosen inter-bulb spacing.

The known containers, such as the container disclosed in WO03/015496, however have the disadvantage that they are too rigid, which prevents flexible use of the container.

Another disadvantage is that with these containers a desired shape is obtained using a mould. These moulds are made exclusively by specialized companies and involve large investments and preproduction times. For instance, when one desires a container of a particular shape, a new mould may involve a large initial investment sum. For these reasons, the possibilities with regard to size and shape as well with regard to customizing size and shape are rather limited.

An additional disadvantage is that due to their lack of flexibility, the containers known in the art occupy a large space during transport and storage. This makes transport and storage costs rather high.

Because of their inflexibility and their large size, it is also difficult for the known containers to provide a suitable and attractive display box or rack.

It is therefore an aim of the invention to provide a package for holding, storing, transporting and direct planting into the ground a plurality of flower bulbs which allows for pre-planting, off-the-shelf selection by the consumer of flower bulbs of possible differing variety, biocompatibility and colour, which is biodegradable and provides a means to hold bulbs at their optimal inter-bulb spacing at a correct position, and which does not have the abovementioned disadvantages with respect to the requirement of a mould, low flexibility, limited possibilities for customizing and displaying difficulties.

DESCRIPTION OF THE INVENTION

The present invention therefore relates in one aspect to a flexible biodegradable package with flower bulbs for holding, storing, transporting and direct planting into the ground a plurality of flower bulbs, wherein said plurality of flower bulbs is contained between a flexible top layer of material comprising biodegradable fibers and a flexible bottom layer of material comprising biodegradable fibers, wherein said flower bulbs are separated by inter-bulb areas effected by a pre-selected inter-bulb distance, the bulbs being in a fixed position and a preferred planting orientation, said top layer being glued to the bottom layer at the inter-bulb areas and at the periphery of said layers.

In another aspect the invention relates to a method for manufacture of a flexible biodegradable package for flower bulbs, comprising selecting a plurality of flower bulbs; placing said flower bulbs on a first layer of a material comprising biodegradable fibers in a pre-selected spatial orientation for subsequent planting, wherein said orientation comprises spacing apart said bulbs relative to one-another with a pre-selected inter-bulb distance and placing the bulbs in a preferred planting orientation; and gluing said first layer to a second layer of a material comprising biodegradable fibers, such that said bulbs are enclosed between the two layers in a fixed position. In this method for manufacturing the package of the invention the first layer may refer to the bottom layer, which is glued to the second layer which in this case is the top layer, or alternatively, the first layer may refer to the top layer which is glued to the second layer which refers in the latter case to the bottom layer. A package manufactured by the method of the invention may result in a package of any size. For example the method may result in large sheets of packaged bulbs, which can be folded, stacked, rolled or a combination thereof for transport and storage and at a chosen moment be further processed to a consumers product in any size or shape. To optimize growth conditions, it will be apparent that in this method the bulbs are preferably placed in a planting orientation such that all undersides from which the roots will develop are placed facing the upper surface of the bottom layer, while all uppersides from which new stems and leaves develop are placed facing the lower surface of the top layer.

The material of which the layers are made is preferably essentially composed of said biodegradable fibers. A person of ordinary skill will acknowledge that a material that is essentially composed of a particular substance may also contain unavoidable impurities or additives depending on the desired properties of the material. Therefore, such impurities or additives should represent less than 5 weight %, preferably less than 1 weight %, most preferably less than 0.1 weight % of the material. In a preferred embodiment, the material of forming the layers in the package is essentially composed of cellulose fibers. Cellulose fibers provide strength and prevent the layers from tearing. Such material essentially composed of cellulose fibers is preferably paper, in particular recycled paper. Paper is available in any size from rolls or stacks of sheets and is cheap compared to other biodegradable materials. Preferably recycled unbleached paper is used because this way less harmful compounds will leach into the ground. The layers are permeable for water and nutrients, because if the material is in the soil it softens immediately, allowing bulbs to be in contact with water and nutrients immediately after planting.

Because of the properties of the material, the layers of the package may be provided as thin sheets that render the package a flexible nature. A layer should have flexibility properties that allow for easy and compact folding or rolling of the package. It should be understood that cardboard (with a grammage of >180 g/m$^2$) is a too rigid material for these purposes. To allow easy and compact folding of the package, a layer made of paper preferably has a grammage range of 10 g/m$^2$-75 g/m$^2$, for instance between 10 g/m$^2$ and 50 g/m$^2$ or between 23 and 32 g/m$^2$. The package of the invention overcomes the abovementioned disadvantages because due to its flexibility, the package may be stored in an economically attractive way. This can be realized by rolling or folding the package. This makes the cost price substantially lower than that of the packages known in the art. In one aspect therefore, the invention also relates to a method for storage of flower bulbs packed in the flexible biodegradable package of the invention, wherein said package is rolled or folded. It is estimated that of a rigid package, such as the one described in WO03/015496, with a representative amount of 20 bulbs packed therein, about 6000 packages may be transported in an average truck. Of a package of the invention with the same amount of bulbs about 40000 packages may be transported. This significantly lowers the costs for transport.

The material is easy to handle and different sizes and shapes of packages may conveniently be made. The package of the invention may be manufactured in any size or any desired shape, for instance in a heart shape, a star shape, or in the shape of a letter. The package of the invention does not require the use of expensive moulds or templates, therefore any desired shape of package may be may made in house.

Alternatively, consumers may adjust the shape or size of the package depending on their specific wishes. For this purpose the package of the invention may be provided with one or more perforation lines. Such perforation lines are lines of small holes that are punched in the paper that make it easier to tear paper separate.

The substance used to glue the two layers together is preferably biodegradable glue. Water soluble glues are usually biodegradable. The two layers of the package of the inventions are therefore preferably glued to the each other by means of a water based glue.

Since the package of the invention is biodegradable, the invention relates in another aspect to a method for planting flower bulbs into the ground, wherein the total package of the invention is placed into the ground, without unpacking the flower bulbs, at a pre-selected planting depth suitable for healthy growth of said flower bulbs.

Additives may be added to the package. The package therefore may comprise any agent that has a beneficial effect to growth or storage of the bulbs. The package therefore may comprise one or more agents selected from the group consisting of preservatives, fertilizers, pest repellents and growth promoters. Such agents are either supplied separately or impregnated in the top and/or bottom layers.

The package of the invention may comprise a plurality of bulbs of more than one variety. Different packages may comprise different sets of bulbs. A set of bulbs may be comprised of one species in the same variety, one species in different varieties, or of different species in one or more varieties. The composition of the set of bulbs may be designed to optimize the colour or colour combinations during flowering, biocompatibility, time of flowering or the inter-bulb distance. The inter-bulb distance used in the package is dependent on the species of flower bulbs or the variety of species of flower bulbs. Different species or varieties may require different inter-bulb distances. For instance small bulbs generally require an inter-bulb distance of approximately 2 cm, while larger bulbs may require a larger distance. For tulip bulbs for instance a distance of 5 cm may be sufficient, for daffodils and hyacinths a minimal distance of about 7 cm is preferred.

Due to the flexible nature of the package of the invention there are a lot of possibilities for attractive display. The package may for instance be displayed in an attractive box or or displayed on a rack or shelves. A consumers package may conveniently be supplied with a manual containing information about the composition of the set of bulbs, the colour or colour combination of the flowers that will grow out of the bulbs, the time of flowering, the preferred conditions for growth, the preferred treatment after planting etc. The material of which the package is made may alternatively contain information printed thereon, such as a picture or representation of the expected pattern of flowers growing from the bulbs or in addition or alternatively contain an instruction manual directly printed on the layers.

SHORT DESCRIPTION OF THE FIGURES

FIGS. 1A and B: Exemplary embodiments of the package of the invention.
FIG. 2: Folded package of the invention
FIG. 3: Example of display of package of the invention.
FIG. 4: rolled package of the invention.
FIG. 5: folded package of the invention.

EXEMPLARY EMBODIMENTS

In an exemplary embodiment of the invention bulbs are packed between sheets made of recycled paper using a regular water based glue. FIGS. 1A and B show representative packages 1 that are ready to use for a consumer. The shape of the package may be circular as shown in FIG. 1A or rectangular as shown in FIG. 1B. The flower bulbs 2, 2a and 2b are shown as circles with a dotted line. The interbulb distances A are indicated with arrows. The package shown in FIG. 1A bears bulbs of different species: bulbs 2a and bulbs 2b. Bulbs 2b have a bigger size than bulbs 2a. Therefore the interbulb distances, indicated with arrows A, vary. In this particular package, the interbulb distance A1 between the small bulbs 2a is about 5 cm. The interbulb distances A2 between the larger bulbs 2b or between a large bulb 2b and a small bulb 2a is about 8 cm. FIG. 2 shows how a package 1 of the invention can be folded in order to provide a compact package 3 that can be easily put in a further package or holder 4 for display purposes. Such a holder 4 may be formed of a folded piece of material rendering protective sheets 5 for the folded compact package 3. The top folded part 6 may contain an opening 7 for hanging the holder 4 on a rack for display purposes. FIG. 3 shows how the package of the invention may be displayed in holder 4.

Figure 1B:
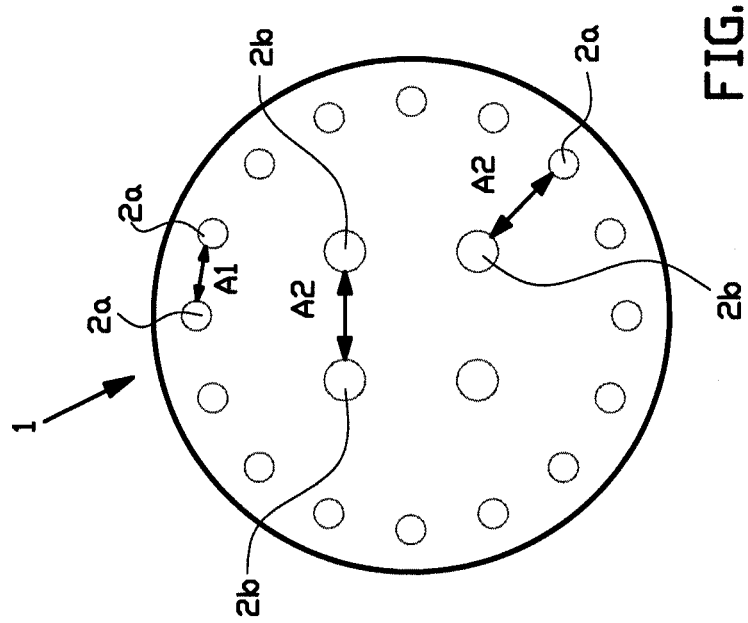
Figure 1A:
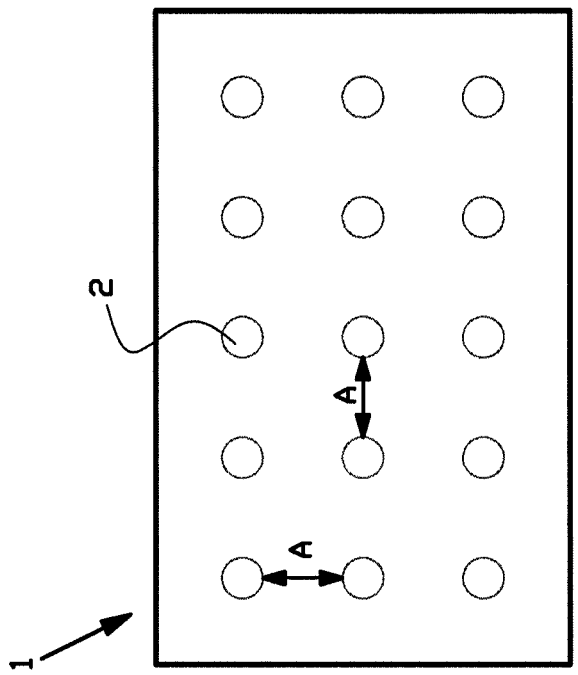
Figure 3:
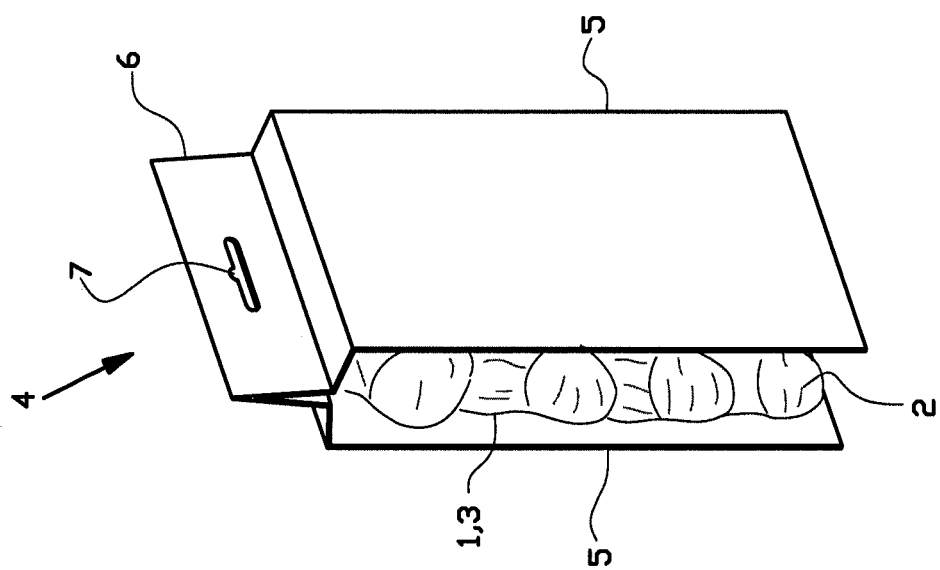
Figure 4:
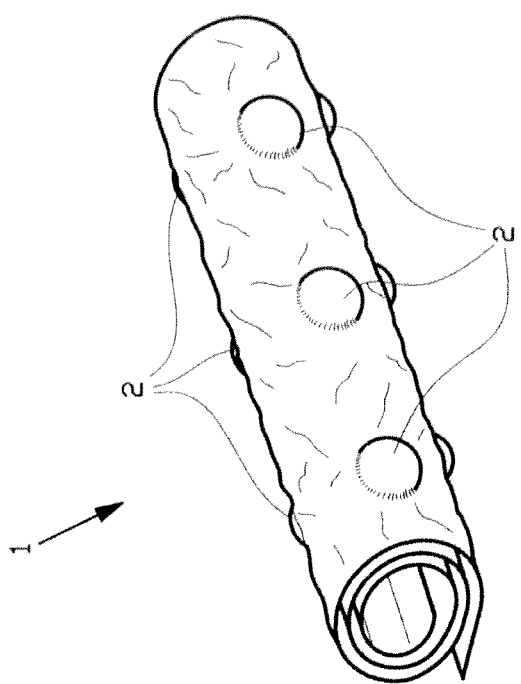
FIG. 4 shows how a package 1 of the invention can be rolled in order to provide a compact package.
Figure 5:
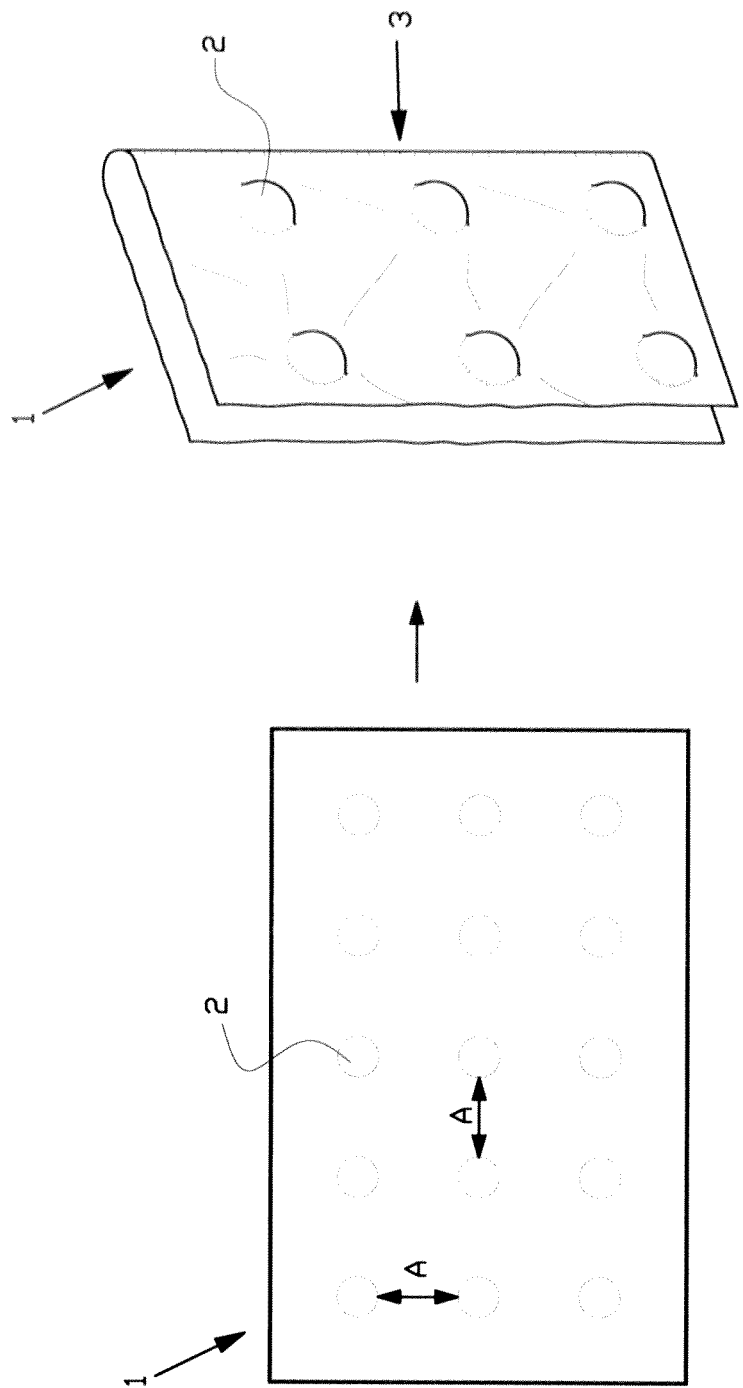
FIG. 5 shows how a package 1 of the invention can be folded in order to provide a compact package.

The invention claimed is:

1. A flexible biodegradable package with flower bulbs for holding, storing, transporting and direct planting into the ground a plurality of flower bulbs,
    wherein said plurality of flower bulbs is enclosed in planar arrangement with respect to each other between a flexible top layer of material comprising biodegradable fibers and a flexible bottom layer of material comprising biodegradable fibers,
    wherein said flower bulbs are separated by inter-bulb areas effected by a pre-selected inter-bulb distance, the bulbs being in a fixed position and a preferred planting orientation,
    said top layer being glued to the bottom layer at the inter-bulb areas and at the periphery of said layers, wherein the layers have flexibility properties which enable the package to be one of folded at least one time and rolled so as to have a cylindrical shape.

2. The flexible biodegradable package according to claim 1, wherein said material is essentially composed of cellulose fibers.

3. The flexible biodegradable package according to claim 2, wherein said material is paper.

4. The flexible biodegradable package according to claim 2, wherein the top layer is glued to the bottom layer by means of a water based glue.

5. The flexible biodegradable package according to claim 3, wherein the top layer is glued to the bottom layer by means of a water based glue.

6. The flexible biodegradable package according to claim 1, wherein the top layer is glued to the bottom layer by means of a water based glue.

7. The flexible biodegradable package according to claim 1, comprising a plurality of bulbs of more than one variety.

8. The flexible biodegradable package according to claim 1, wherein the inter-bulb distance is dependent on the species of flower bulbs or a variety of species of flower bulbs.

9. The flexible biodegradable package according to claim 1, wherein the package is provided with one or more perforation lines.

10. The flexible biodegradable package according to claim 1, wherein said package includes a layer made of paper having a grammage range of 10 $g/m^2$-75 $g/m^2$.

11. A method for planting flower bulbs packed in the flexible biodegradable package of claim 1, wherein the total package is placed into the ground, without unpacking the flower bulbs, at a pre-selected planting depth suitable for healthy growth of said flower bulbs.

12. A method for manufacture of a flexible biodegradable package for flower bulbs, comprising
    selecting a plurality of flower bulbs;
    placing said flower bulbs on a first layer of a material comprising biodegradable fibers in a pre-selected spatial orientation for subsequent planting, wherein said orientation comprises spacing apart said bulbs relative to one-another with a pre-selected inter-bulb distance and placing the bulbs in a preferred planting orientation,
    gluing said first layer to a second layer of a material comprising biodegradable fibers, such that said bulbs are enclosed in a planar arrangement with respect to each other between the two layers in a fixed position, wherein the layers have flexibility properties sufficient for at least one of folding the package at least one time and rolling the package so as to have a cylindrical shape.

13. The method according to claim 12, wherein said material is essentially composed of cellulose fibers.

14. The method according to claim 13, wherein said material is paper.

15. The method according to claim 13, wherein gluing takes place with a water-based glue.

16. The method according to claim 14, wherein gluing takes place with a water-based glue.

17. The method according to claim 12, wherein gluing takes place with a water-based glue.

18. The method according to claim 12, wherein said inter-bulb distance is dependent on the species of selected bulbs or on the variety of species of selected bulb species.

* * * * *